United States Patent
Turos

[11] 3,900,578
[45] Aug. 19, 1975

[54] PROCESS FOR PREPARING SO CALLED CRUMB FOR THE MANUFACTURE OF MILK CHOCOLATE

[75] Inventor: Sandor Turos, Stockholm, Sweden

[73] Assignee: Semper AB, Stockholm, Sweden

[22] Filed: July 30, 1973

[21] Appl. No.: 383,561

[30] Foreign Application Priority Data
Aug. 18, 1972 Sweden .............................. 10811/72

[52] U.S. Cl. ................. 426/580; 426/656; 426/658; 426/471
[51] Int. Cl. .............................................. A23c 1/00
[58] Field of Search ........... 426/171, 174, 187, 213, 426/359, 364, 380, 289

[56] References Cited
UNITED STATES PATENTS
2,835,593  5/1958  Rusoff.............................. 426/65 X
3,622,342  11/1971  Rusoff................................ 426/359

*Primary Examiner*—A. Louis Monacell
*Assistant Examiner*—R. A. Yoncoskie
*Attorney, Agent, or Firm*—Spencer & Kaye

[57] ABSTRACT

A process for the preparation of crumb for use in the manufacture of chocolate products comprises admixing first and second streams of reactant materials to form a mixture thereof, feeding the mixture onto a heating means and concentrating and heat treating the mixture to cause a Maillard reaction between the reactant materials. The first stream comprises a milk concentrate based upon whole milk or milk having decreased fat content, with the milk concentrate having a dry solids content of about 20 to 70% by weight.

The second stream comprises an aqueous solution or suspension containing one or more amino acids reactive with the milk concentrate of the first stream in the Maillard reaction. The amino acid or acids are present in an amount up to 4% by weight based on the dry milk solids content of the first stream.

18 Claims, 1 Drawing Figure

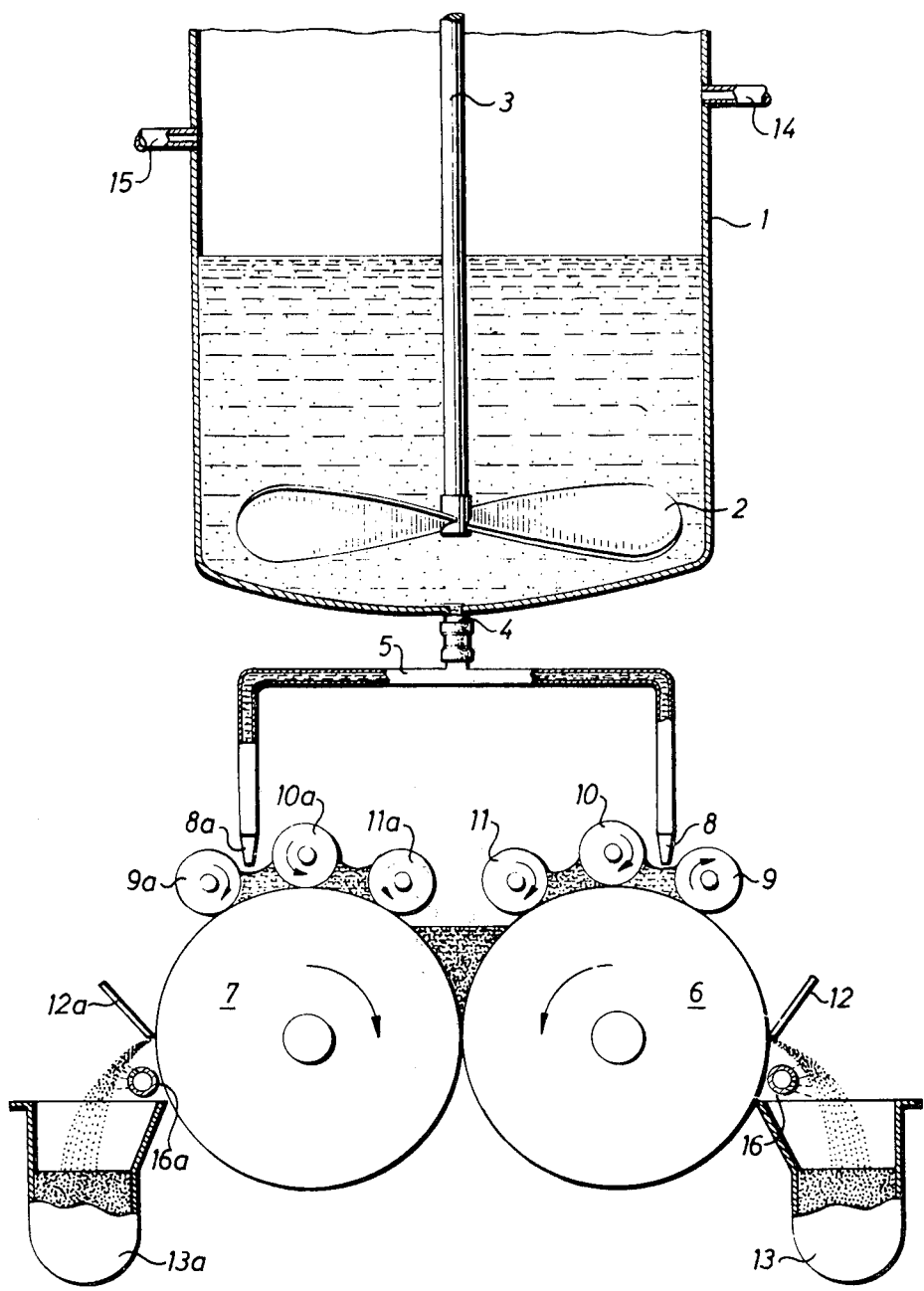

PROCESS FOR PREPARING SO CALLED CRUMB FOR THE MANUFACTURE OF MILK CHOCOLATE

The present invention relates to a process for preparing so-called "crumb" which is a raw material used for the manufacturing of milk chocolate.

The manufacturing of milk chocolate is conventionally made by mixing solid constituents of whole milk, sugar, cocoa powder and cocoa fat, whereupon the milk chocolate is prepared, if desired with the addition of flavouring agents. Since a very long time this procedure has comprised pre-manufacturing of an intermediate, so-called crumb, consisting of the milk components, sugar and the cocoa constituents. The mixture of the said components is submitted to a heat treatment which causes a brown-colouring of the mixture and a flavour change therein which both are of importance for the quality of the end product. During the heat treatment a reaction occurs which is usually called the Maillard reaction.

The Maillard reaction which thus causes desired changes of the colour and the flavour in the mixture, is a so-called "carbonyl/amino reaction" and comprises reaction of reducing sugars present, such as glucose, lactose, maltose, etc., with amino groups in amino acids and proteins present in the milk and other substances. Milk chocolate prepared according to the crumb process is of a good quality and the crumb process is thus generally applied. However, from a foodstuff physiological point of view the conventional crumb process gives a product in which valuable essential amino acids present in the milk have been bound so that the nutritional value of the milk chocolate is decreased in a corresponding degree.

The conventional crumb process comprises mainly mixing of the crude milk after analysis and heat treatment with sugar, whereupon the solution is condensed in a vacuum for obtaining a desired homogeneous product containing crystals of saccharose and lactose. This condensed milk is then mixed in certain proportions with cocoa constituents and the whole mixture is then dried in a vacuum and in heat to a water content not greater than 1.5 %, for performing the above-described Maillard reaction. The drying and the heat treatment are made in a drying cabinet or similar and are usually performed during a relatively long period of time and at a vacuum of up to 100 mms. Hg or more and for a time of 2 hours or more. After the heat treatment the mass obtained is powdered and sieved and stored at a somewhat increased temperature for some days for ripening.

From the description above it is obvious that the hitherto used process for preparing crumb is performed in a batchwise manner, is time-consuming and requires spaceous and expensive apparatus. The possibilities to control the Maillard reaction are small and great temperature differences occur in different parts of the mass during the reaction which causes that the product is not uniform.

The present invention relates to an improved process for preparing crumb of the above-mentioned type, which process is preformed continuously and at an atmospheric pressure in a very short period of time, viz, a few seconds, and with the use of commonly occurring, simple apparatus such as driers of the roller or band types or similar.

As the raw material for the process according to the invention milk is used with addition of preferably only such components which are active in the Maillard reaction, viz, amino acids and suitably also with the addition of reducing sugars. Thus, the cocoa constituents are preferably not present in the process according to the invention, especially since they do not essentially take part in the Maillard reaction for brown-colouring and flavour changes. It is thus preferred that the said constituents are added in a later stage of the milk chocolate manufacturing.

The milk or the milk concentrate contains amino acids as well as reducing sugars which take part in the Maillard reaction but inter alia for the above-mentioned reasons amino acids are added according to the invention and preferably also reducing sugars further to those present in the milk, the Maillard reaction to the formation of colour and flavour being made without any change of the nutritional value of the milk. The extra addition of amino acids and reducing sugars also causes that the Maillard reaction occur more rapidly and in a more complete manner which is of a decisive importance for the suitability of the end product as a raw material for the manufacturing of milk chocolate. This of course means that the product obtained, the crumb, is of a high quality which is also true as regards products prepared thereof.

The invention thus relates to a process for preparing so-called crumb, especially suitable as a raw material for the manufacturing of milk chocolate, which process is characterized by feeding into a mixing vessel provided with a stirrer partly a first flow of a milk concentrate based on whole milk or on milk having a decreased fat content, the milk concentrate having a dry solids content of 20–70 % by weight, preferably 40–50 % by weight, and partly a second flow consisting of an aqueous solution or a suspension containing one or more amino acids which are active in the so-called Maillard reaction and preferably one or more reducing sugars, the amount of added amino acid being up to 4 % by weight, preferably 0.1–2 % by weight, calculated on the dry milk solids in the first flow, and the added amount of reducing sugar being up to 40 % by weight, suitably 1–15 % by weight and preferably 2–5 % by weight, calculated on the total content of solid substances in the mixed flows, whereupon the mixture at a constant composition is fed in the form of a film onto a heated metal surface such as in a roller or band drier for concentration and heat treatment, i.e. the Maillard reaction.

The amino acids which may be added in the process are such which are active in the Maillard reaction, viz, for instance the following: glycine, alanine, valine, lysine. Lysine is especially preferred since this amino acid is the most reactive one in the Maillard reaction. Proteins have also a certain activity which, however, in general is too low due to the fact that their content of free amino acids is low and, further, steric effects occur which prevent the Maillard reaction. For sugars the reactivity in the Maillard reaction decreases with an increasing number of carbon atoms, which means that pentoses are more reactive than hexoses which in their turn are more reactive than disaccharides. However, all common reducing sugars can be used such as glucose, xylose, arabinose, fructose, galactose, mannose, lactose, etc. The preferred reducing sugar is glucose.

As mentioned above the milk concentrate in the first flow in the process according to the invention may be based on whole milk or on milk with a decreased fat content such as fat-free milk. When milk with a decreased fat content is used in the process it is preferred to add a corresponding amount of milk fat emulsified in the second flow, the emulsion being prepared in a manner known per se such as emulsification with the use of a monostearate as an emulsifier and homogenization. However, the use of fat-free milk gives the advantage that the shelf-life of the crumb is increased since milk fat as commonly known may obtain off-flavours when stored in contact with air. When crumb prepared according to the invention having a decreased content of milk fat is used for chocolate manufacturing the decreased fat content can, however, be compensated by adding a corresponding amount of fat when the milk chocolate is manufactured. When the milk fat is present in the crumb it may in many cases be suitable to add a conventional antioxidant.

The velocity of the Maillard reaction is controlled by a number of factors, viz, the pH of the reaction mixture, the temperature and the water content during the Maillard reaction and by the nature of the amino acids and reducing sugars present. As mentioned above, lysine is the most reactive of the common amino acids. The reaction velocity during the Maillard reaction has its maximum when the pH value in the starting mixture is within the range 4–8. The water content in the mixture during the Maillard reaction is of a great importance for the reaction velocity and when high water contents are used the reaction velocity is very low and increases with a decreasing water content. Within the range 10–6 % of water in the mixture submitted to the Maillard reaction the velocity is maximal and at a lower moisture content than 3 % the reaction stops. Thus, it is preferred to adjust the pH value in the mixed flows to a value within the said range 4–8. It is likewise preferred to concentrate the mixed flows to a dry solids content of about 70–85 % by weight before starting the Maillard reaction proper. The concentration is suitably performed at a product temperature which is such that no essential Maillard reaction is occurring, i.e., at a temperature of about 70°–85°C. The Maillard reaction is, as mentioned above, in a high degree dependent also on temperature which during the reaction should be kept within the range 90°–110°C in the film. Practical experiments have shown that such a temperature range usually corresponds to a temperature on the heated metal surface of about 20°C thereabove, i.e., 110°–130°C.

The velocity of the Maillard reaction is dependent on the temperature and experiments have shown that the temperature has a greater influence on the reaction velocity than is normal. The temperature coefficient of the reaction velocity is about 4 against normally 2, i.e., the reaction velocity is increased 4 times for every 10°C temperature increase. The reaction velocity in the Maillard reaction is such that the temperature range 90°–110°C in the film corresponds to a reaction time range of 15–1 seconds. This is valid for the preferred film thickness of the reaction mixture concentrated to a dry solids content of 70–85 %, which normally is about 0.2–0.3 mms. For extremely thick films the reaction time may require some increase or, alternatively, the temperature of the heated metal surface may be increased. In case of films of extreme thinness the reaction time may correspondingly be somwhat shorter or require decrease of the temperature of the metal surface. The preferred reaction time is about 4 seconds at a temperature of about 100° C in the film. It is obvious that the Maillard reaction which occurs at an increased temperature and in contact with air causes a simultaneous drying of the product and it is preferred to use such conditions that the product at the end of the Maillard reaction has a dry solids content of about 97–98.5 % by weight. In this case a product with a maximal shelf-life is obtained and other satisfactory properties for the intended purpose.

The above-described process is the process preferred according to the invention. However, in some instances it may be desired to add, as in conventional crumb manufacturing, also varying amounts of cocoa constituents and/or saccharose. The process according to the invention can be used also for the manufacturing of such conventional crumb. In this case the said constituents are suitably added to the second flow. The invention thus also comprises this modification of the above-described process. However, it does not give any practical advantages to add the said further components or constituents before the heat treatment since they do not take part in the Maillard reaction and in this way greater amounts of material have to be dealt with which increases the costs for manufacturing the crumb. On the contrary, it is most suitable to add the said further constituents after the manufacturing of the crumb as described above. The addition can be made immediately after the manufacturing of the crumb or when the milk chocolate is prepared which seems to be most practical.

Conventional crumb may have a varying composition but the limits for the contents of the different components are roughly within the following ranges:

| Solids constituents of whole milk | : 20 – 45 %, | usually 30 – 40 % |
|---|---|---|
| Sugar | : 30 – 70 %, | usually 40 – 60 % |
| Cocoa constituents | : 5 – 30 %, | usually 5 – 15 % |

In practice the process is performed by feeding into a vessel provided with a stirrer partly a first flow consisting of the milk concentrate and partly a second flow consisting of the aqueous solution containing amino acids and preferably one or more reducing sugars and optionally emulsified fats. The feeding of the two flows is made with the use of metering pumps. The water content in the two flows is not critical but for natural reasons the water content should be as low as possible without obtaining a decreased managability. After an optional pH adjustment the mixture is fed in the form of a film onto a heated metal surface such as in a roller drier of the conventional type. When fed upon the roller the mixture has suitably a dry solids content of about 50 % by weight and the water content is suitably decreased stepwise by evaporation to 70–85 % by weight by providing intermediary "sumps" between smaller rollers in contact with the drying roller, whereupon the concentrated mixture is fed in the form of a film on the surface of the drying roller and after drying the film is scraped-off conventionally. The intended temperature in the film is maintained by heating the drying roller with steam or any other conventional manner. With the use of a band drier it may be suitable to provide for two zones, the first of which comprises a concentration step at a lower temperature in the product, usually 70°–85°C, for concentration of the product to a dry solids content of 70–85 %, followed by a zone for the Maillard reaction at an increased temperature, viz, preferably 90°–110°C in the film. The same zone also suitably comprises the final drying of the product to a dry solids content of 97–98.5 % by weight.

It is obvious from the above that conventional and commonly occurring apparatus can be used for performing the process.

The invention is further elucidated by the following specific examples. The apparatus used in these experiments is diagramatically elucidated in the enclosed drawing.

The apparatus according to FIG. 1 consists of a mixing vessel 1 provided with inlet openings 14 and 15 for the two flows and with a propeller stirrer 2 which is conventionally driven via a shaft 3. Centrally located on the bottom of the mixing vessel is an outlet opening 4 provided which in its turn is connected to a line 5 which is forked over drying rollers 6 and 7 in a conventional roller drying apparatus. The outlet openings 8 and 8a provided with means (not shown) for controlling the liquid amount fed therethrough terminate somewhat above the surfaces of the drying rollers, viz, between the outer rollers 9 and 9a of the series of rollers 9, 10, 11, 9a, 10a and 11a which are arranged as indicated in the drawing in contact with the drying rollers 6 and 7 and somewhat separated from each other. So as to ensure a unitary distribution of the mixture it is suitable that the forked feeding line 5 is brought to move to and fro over the whole roller width. The said series of rollers form intermediary sump pairs in which the dry solids content of the mixture by concentration due to the heating by the contact with the drying rollers 6 and 7 is successively increased. A third concentration step is performed in the third sump formed between the drying rollers 6 and 7 above their contact line. In the apparatus shown in the drawing the mixture fed from the mixing vessel is concentrated from an initial dry solids content of about 45 % to about 55 % in the first sump, whereas a dry solids content of about 60–65 % has been achieved in the second sump. The third sump formed between the two rollers 6 and 7 gives a concentration to a dry solids content of about 70–85 % by weight. From the third sump the concentrated mixture is fed onto the surfaces of the drying rollers by controlling the distance between the rollers in the form of a film having a thickness within the range 0.1–1 mm., usually about 0.2–0.3 mms., for heat treatment and simultaneous drying. With conventional scraping knives 12 and 12a and suitably a so-called "film guide," i.e., tubes 16 and 16a arranged over the whole width of the roller through which warm or cold air is blown against the underside of the scraped-off film so as to facilitate the correct removal of the same, the product is scraped-off and stored in containers 13 and 13a for further treatment such as grinding and sieving.

It is obvious that the above-described apparatus for performing the process according to the invention can be modified in numerous ways. Further, it can be replaced with a conventional band drier suitably adapted for the purpose.

EXAMPLES 1–9

In the above-described apparatus according to FIG. 1 first flows consisting of skimmed milk concentrated to the stated dry solids content and second flows containing the further components in the amounts stated in the table were fed in the experiments according to Examples 1–9 below. However, in the first experiment no second flow was used. The experiments according to Examples 1–3 are comparative experiments.

In the first sump the mixture was concentrated to a dry solids content of 50–55 % and in the second sump the mixture was concentrated to a dry solids content of 60–65 %, whereas the mixture in the third sump between the two drying rollers was concentrated to a dry solids content of about 70–85 %. In Table I the experimental conditions are stated, viz, the dry solids content of the mixture in the mixing vessel, the roller temperature and the film temperature on the drying roller and the reaction time for the film applied.

Table I.

| Example No. | The composition of the mixture (dry solids) | | Dry solids content of the mixture % | Roller temperature °C | Film temperature °C | Reaction time seconds |
|---|---|---|---|---|---|---|
| 1 | Dry skimmed milk | 180 kgs. | 43 | 125 | 105 | 4 |
| 2 | Dry skimmed milk | 180 kgs. | | | | |
|   | Dextrose | 3 kgs. | 43 | 125 | 104 | 4 |
| 3 | Dry skimmed milk | 180 kgs. | | | | |
|   | Dextrose | 6 kgs. | 43 | 123 | 100 | 4 |
| 4 | Dry skimmed milk | 180 kgs. | | | | |
|   | Lysine | 3 kgs. | 43 | 122 | 98 | 4 |
| 5 | Dry skimmed milk | 180 kgs. | | | | |
|   | Lysine | 6 kgs. | 42 | 125 | 102 | 4 |
| 6 | Dry skimmed milk | 180 kgs. | | | | |
|   | Dextrose | 3 kgs. | 42 | 125 | 102 | 4 |
|   | Lysine | 3 kgs. | | | | |
| 7 | Dry skimmed milk | 180 kgs. | | | | |
|   | Dextrose | 6 kgs. | 42 | 125 | 105 | 4 |
|   | Lysine | 3 kgs. | | | | |
| 8 | Dry skimmed milk | 180 kgs. | | | | |
|   | Dextrose | 3 kgs. | 43 | 125 | 108 | 4 |
|   | Lysine | 6 kgs. | | | | |
| 9 | Dry skimmed milk | 180 kgs. | | | | |
|   | Dextrose | 6 kgs. | 43 | 125 | 108 | 4 |
|   | Lysine | 6 kgs. | | | | |

In Table II below, the properties of the products obtained according to Examples 1–9 are stated. The table shows that the skimmed milk powder without addition of amino acid or reducing sugar (Example 1) did not obtain the desired brown colour and flavour and the product was not suitable for the manufacturing of milk chocolate with the crumb "character." Addition of dextrose (Examples 2 and 3) increased the brown colour due to the reaction of the dextrose with amino acids present in the milk components. In Example 4 in which lysine was added a product was obtained which had brown colour as well as a good taste. This brown colour and also the taste became more marked in the following experiments according to Examples 5–9, the taste as well as the flavour increasing with increasing amounts of reducing sugar and amino acid.

Similar results were obtained with the use of other reducing sugars and other amino acids.

Table II.

| Product | The properties of the products. Properties |
|---|---|
| According to Example 1 | Somewhat yellowish colour. The taste similar to that of roller dried skim-milk powder. |
| According to Example 2 | Cf. above. |
| According to Example 3 | The colour somewhat more brown than in Example 1; the taste more "round" but the product not acceptable. |
| According to Example 4 | Brownish colour with good taste. |
| According to Example 5 | Browner colour than according to Example 4; the taste somewhat too "heavy". |
| According to Example 6 | The same colour as in Example 5; the taste pronounced and good. |
| According to Example 7 | Considerably more brown colour than in the examples above; the taste pronounced and good. |
| According to Example 8 | Strongly brownish colour; the taste too heavy. |
| According to Example 9 | Strongly brownish colour; the taste too heavy. |

EXAMPLE 10

In a three step evaporator 2,000 kgs. of skimmed milk were evaporated to a dry solids content of 40–45 % which was used as a first flow in this experiment. The second flow contained 0.5 % lysine (0.9 kgs.), calculated on the dry solids in the first flow and 3.5 % of dextrose (9.3 kgs.), calculated on the dry end product. The flow contained further 67 kgs. of butter fat, viz, about the amount corresponding to the fat content in 2,000 kgs. of whole milk. The butter fat was emulsified with the aid of 0.1 % glyceryl monostearate, calculated on the dry end product, with a Rannie Homo-mic 2872 homogenisor at 160 kp/cm$^2$ to the formation of an emulsion of the type oil-in-water.

The flows so prepared were mixed as described above in the apparatus according to FIG. 1 and were concentrated and heat treated.

The product obtained was golden brown in colour and had a good flavour and was excellently suitable for use in the manufacturing of milk chocolate. The composition of the product was the following: 93.6 % whole milk, 3.5 % dextrose and 2.9 % water, calculated on the finished crumb.

EXAMPLE 11

Manufacturing of Crumb Containing Cocoa Constituents and Sugar 400 kgs. of skim-milk concentrate (45 %) were used as the first flow in this example.

The second flow consisted of a concentrated aqueous solution containing 0.5 % lysine, (0.9 kgs.), calculated on the dry milk solids. Further, the flow contained 3.5 % dextrose (9.3 kgs.), 10.5 % cocoa powder (28 kgs.) with a fat content of 24 % or 16 % of cocoa mass (41 kgs.) and 14 % saccharose (36 kgs.), calculated on the dry end product. Further, the flow contained 67 kgs. of butter fat, viz, about the amount corresponding the fat content in 2,000 kgs. of whole milk. The butter fat was emulsified with the aid of 0.1 % of glyceryl monostearate, calculated on the dry end product, with a Rannie Homo-mic 2872 homogenisor at 160 kp/cm$^2$ to the formation of an emulsion of the type oil-in-water.

The product obtained was brown in colour and had good flavour and was excellently suitable for the manufacturing of milk chocolate.

The product according to Example 10 was used for preparing milk chocolate in the following manner: 42 % crumb and 58 % powder sugar were mixed in a Nanta mixer to a homogeneous mass. 70 kgs. of this mass were mixed with 6.6 kgs. of cocoa mass (neutral rosting) and 7 kgs. of cocoa butter in a Z mixer, whereupon the mass was rolled in two steps to a particle size $\geq$ 15 $\mu$m and a further 16.6 kgs. of cocoa butter added thereto. Cakes were prepared from this mass in a conventional manner. They were compared with milk chocolate of a corresponding composition based on crumb manufactured conventionally. The both products were tested by a panel consisting of 16 persons who had to judge appearance, colour, consistency, brake and taste. The judgment was made according to a scale 7–1 in which 4 was regarded to be acceptable. The result is stated in the following table.

Table III.

| | | Appearance | Colour | Consistency | Brake | Flavour |
|---|---|---|---|---|---|---|
| A | Average value | 5.6 | 5.6 | 5.2 | 4.9 | 5.0 |
| | Distribution | 7–4 | 7–4 | 7–3 | 7–1 | 7–3 |
| B | Average value | 5.5 | 5.7 | 5.2 | 5.1 | 4.9 |
| | Distribution | 7–4 | 7–4 | 7–1 | 7–1 | 7–1 |

A was the chocolate prepared with the crumb according to the invention B was the chocolate prepared with conventional crumb.

The table shows that the chocolate A prepared with the crumb according to the invention was directly comparable with milk chocolate prepared with conventional crumb. In certain respects the experimental results show that the product prepared with the crumb according to the invention was somewhat superior. The advantages with the use of the crumb according to the invention are thus partly unchanged or somewhat improved quality of the milk chocolate prepared and above all decreased manufacturing costs due to the continuous manufacturing and the lower apparatus costs and decreased space requirements.

The process according to the invention also gives the advantage that it is possible to carefully control the colour and the flavour of the crumb which is very desirable for preparing milk chocolate of different types.

I claim:

1. A process for the preparation of crumb for use in the manufacture of chocolate products which comprises admixing first and second streams of reactant materials to form a mixture thereof, feeding said mixture onto a heating means, and concentrating the heat treating said mixture to cause a Maillard reaction between said reactant materials;

said first stream comprising a milk concentrate based upon whole milk or milk having decreased fat content, said milk concentrate having a dry solids content of about 20 to 70% by weight; and said second stream comprising an aqueous solution or suspension containing one or more amino acids reactive with said milk concentrate of said first stream in the Maillard reaction, said amino acid or acids present in an amount from 0.1 to 4% by weight based on the dry milk solids content of said first stream.

2. The process of claim 1 wherein said milk concentrate has a dry solids content of about 40 to 50% by weight.

3. The process of claim 1 wherein said second stream further comprises one or more reducing sugars added in an amount up to 40% by weight based on the total dry solids content of the mixed streams.

4. The process of claim 3 wherein said amount of said added reducing sugars is from 1 to 15%.

5. The process of claim 3 wherein said amount of said added reducing sugar or sugars is from 2 to 5%.

6. The process of claim 1 wherein said amount of amino acid or acids is from 0.1 to 2%.

7. The process of claim 1 wherein said heating means is a band or roller dryer.

8. The process of claim 1 wherein milk fat is added as an emulsion to said second stream in an amount up to 40% by weight, based on the weight of the prepared crumb.

9. The process of claim 1 wherein said amino acid or acids is or are selected from the group comprising glycine, alanine, valine and lysine.

10. The process of claim 1 wherein said amino acid is lysine.

11. The process of claim 1 wherein said reducing sugar or sugars is or are selected from the group consisting of glucose, xylose, arabinose, fructose, galactose, and mannose.

12. The process of claim 1 wherein said reducing sugar is glucose.

13. The process of claim 1 wherein the pH of said mixture is from 4 to 8.

14. The process of claim 1 wherein said mixture is concentrated upon a first area of said heating means to a dry solids content of from about 70–85% by weight and at a temperature of 70°–85°C, prior to said heat treatment thereof.

15. The process of claim 1 wherein said heat treatment is performed by heating said reactant materials to a temperature of from 90°–110°C and for a corresponding period of time from 15 to 1 second.

16. The process of claim 1 wherein said heat treatment is performed by heating said reactant materials to a temperature of 100°C for about 4 seconds.

17. The process of claim 1 wherein said heat treatment is performed with simultaneous drying of the product of such heat treatment to a dry solids content of at least about 97% by weight.

18. A process for the preparation of crumb for use in the manufacture of chocolate products which comprises forming an aqueous mixture containing a milk concentrate based upon whole milk or milk having decreased fat content, said milk concentrate having a dry solids content of about 20 to 70% by weight and one or more amino acids reactive with the milk concentrate in the Maillard reaction, said amino acid or acids being in addition to the amino acids present in the milk concentrate and being present in an amount from 0.1 to 4% by weight based on the dry milk solids content, feeding said mixture onto a heating means, and concentrating and heat treating said mixture to cause a Maillard reaction between said reactant materials.

* * * * *

UNITED STATES PATENT OFFICE
CERTIFICATE OF CORRECTION

PATENT NO. : 3,900,578
DATED : August 19th, 1975
INVENTOR(S) : Sandor Turos

It is certified that error appears in the above-identified patent and that said Letters Patent are hereby corrected as shown below:

In the heading of the patent, under [30] Foreign Application Priority Data, change "Aug. 18, 1972" to --Aug. 21, 1972--.

Column 8, line 12, change "16% of cocoa mass" to --16% cocoa mass--.

Column 9, line 6, change "the" to --and--.

Signed and Sealed this eighth Day of June 1976

[SEAL]

Attest:

RUTH C. MASON
*Attesting Officer*

C. MARSHALL DANN
*Commissioner of Patents and Trademarks*